United States Patent
Blanke

[19]

[11] Patent Number: 6,029,945
[45] Date of Patent: Feb. 29, 2000

[54] SELF-CLOSING VALVE

[75] Inventor: Willfried Blanke, Minden, Germany

[73] Assignee: Dal-Georg Rost & Sohne Sanitaramaturen GmbH, Westfalica, Germany

[21] Appl. No.: 09/157,190

[22] Filed: Sep. 18, 1998

[30] Foreign Application Priority Data

Oct. 1, 1997 [DE] Germany ............. 197 43 443

[51] Int. Cl.[7] .................................. F16K 21/04
[52] U.S. Cl. .................. 251/15; 251/37; 251/48
[58] Field of Search .................. 251/15, 16, 18, 251/22, 37, 48; 137/504

[56] References Cited

U.S. PATENT DOCUMENTS

| | | | |
|---|---|---|---|
| 2,329,001 | 9/1943 | Robinson | 251/36 |
| 3,806,081 | 4/1974 | Otto | 251/22 |
| 3,902,521 | 9/1975 | Keller et al. | 251/35 X |
| 4,777,975 | 10/1988 | Strangefeld | 137/244 X |
| 4,973,025 | 11/1990 | Iqbal | 251/48 |
| 5,362,026 | 11/1994 | Kobayashi et al. | 251/30.02 |
| 5,427,351 | 6/1995 | Korfgen et al. | 251/35 X |

FOREIGN PATENT DOCUMENTS

26 03 731    2/1985    Germany .

*Primary Examiner*—Stephen M. Hepperle
*Assistant Examiner*—John Bastianelli
*Attorney, Agent, or Firm*—Herbert Dubno; Andrew Wilford

[57] ABSTRACT

A self-closing valve assembly has a main valve having a seat between a high-pressure input conduit and a low-pressure output conduit, a main valve element movable into and out of engagement with the seat to block and permit flow from the input conduit to the output conduit, and a chamber behind the main valve element pressurizable to press the main valve element against the seat. A small-diameter passage extends from the input conduit to the chamber so that the chamber can be pressurized via the passage from the input conduit to hold the valve element against the seat. A pilot or control valve connected between the chamber and the output conduit can be opened to depressurize the chamber and thereby lift the valve element off the seat. A throttle valve has a throttle body having an outer face exposed to pressurized liquid in the input conduit and an inner face turned toward a mouth of the passage, a formation on the inner face blockingly engageable with the passage mouth, an abutment adjacent the mouth of the passage and operatively engageable with the throttle body so that the pressurized liquid in the input conduit will urge the body toward the mouth of the passage and toward the abutment, a weak spring for holding the throttle body at a spacing from the mouth and from the abutment, and a strong spring effective when the body inner face is against the abutment for urging the body away from the mouth of the passage.

18 Claims, 6 Drawing Sheets

FIG. 12

SELF-CLOSING VALVE

FIELD OF THE INVENTION

The present invention relates to a self-closing valve. More particularly this invention concerns such a valve used in a toilet or faucet.

BACKGROUND OF THE INVENTION

A standard self-closing valve such as used in a toilet flusher or in a faucet normally has a main valve having a seat between a high-pressure input conduit and a low-pressure output conduit, a main valve element movable into and out of engagement with the seat to block and permit flow from the input conduit to the output conduit, and a release chamber behind the main valve element pressurizable to press the main valve element against the seat. A small-diameter passage extends from the input conduit to the chamber so that the chamber can be pressurized via the passage from the input conduit to hold the valve element against the seat. A pilot or control valve connected between the chamber and the output conduit can be opened to depressurize the chamber and thereby lift the valve element off the seat.

This simple system therefore allows the valve to be opened suddenly to allow a rush of water past the seat. As the chamber repressurizes via the throttle passage, the main valve body moves back to the closed position. The main problem with this system is that, if the throttle passage has too small a flow cross section, the valve stays open much too long while if it is too large the valve closes brusquely, creating noise and a pressure shock in the line.

Accordingly it has been suggested in German patent 2,603,731 of Blanke provides at the mouth of the throttle passage a special throttle valve having a throttle piston having an outer face exposed to pressurized liquid in the input conduit and an inner face turned toward a mouth of the passage and provided with a throttle rod with a tapered tip engageable in the passage mouth. A spring urges the piston outward, away from the passage, and orifices in or around the piston allow liquid to pass through it. Thus the tapered end will initially be engaged deeply in the passage mouth, wholly or substantially blocking it, until the pressure differential across the piston lessens, whereupon it will pull back and allow increased flow through the passage to the release chamber.

Such an arrangement does indeed provide a somewhat smoother closing of the valve, but has several disadvantages. First of all its structure is fairly bulky, making it unsuitable for installation right in an automatic-shutoff faucet of the type used in commercial establishments. It also is prone to jamming, as the small gap between the rod tip and the mouth can catch foreign bodies, blocking the piston's movement and rendering the throttle valve ineffective.

OBJECTS OF THE INVENTION

It is therefore an object of the present invention to provide an improved self-closing valve.

Another object is the provision of such an improved self-closing valve which overcomes the above-given disadvantages, that is which closes smoothly and which is not prone to fouling.

SUMMARY OF THE INVENTION

A self-closing valve assembly has according to the invention a main valve having a seat between a high-pressure input conduit and a low-pressure output conduit, a main valve element movable into and out of engagement with the seat to block and permit flow from the input conduit to the output conduit, and a chamber behind the main valve element pressurizable to press the main valve element against the seat. A small-diameter passage extends from the input conduit to the chamber so that the chamber can be pressurized via the passage from the input conduit to hold the valve element against the seat. A pilot or control valve connected between the chamber and the output conduit can be opened to depressurize the chamber and thereby lift the valve element off the seat. A throttle valve according to the invention has a throttle body having an outer face exposed to pressurized liquid in the input conduit and an inner face turned toward a mouth of the passage, a formation on the inner face blockingly engageable with the passage mouth, an abutment adjacent the mouth of the passage and operatively engageable with the throttle body so that the pressurized liquid in the input conduit will urge the body toward the mouth of the passage and toward the abutment, a weak spring for holding the throttle body at a spacing from the mouth and from the abutment, and a strong spring effective when the body inner face is against the abutment for urging the body away from the mouth of the passage.

Thus with this system when the pressure differential across the throttle body is small or zero, the weak spring will hold it out completely off the passage mouth. No particles can be trapped so that this mouth will remain clear. Once there is a pressure differential, however, the system will work automatically to close the main valve gently.

In accordance with the invention the throttle body is a piston and the formation is a throttle rod fixed on the piston and engageable in the passage. A sleeve surrounds the piston and is engageable with the abutment and the weak spring is braced between the abutment and the sleeve. The strong spring is braced between the sleeve and the piston. The throttle rod has a cylindrical outer end fittable with play in the passage mouth and immediately adjacent thereto a frustoconical portion.

In another system of this invention the passage mouth is formed as a recess having an outer edge forming the abutment and the throttle body has a relatively resilient outer region forming the weak spring and engageable with edges of the recess and a relatively hard center portion forming the strong spring. The throttle body is formed of an elastomerically deformable material and the center portion is a generally conical thickened portion. In addition the throttle body includes a ring element generally engaged around the main valve element and formed with the outer region and center portion and this ring element is open and the main valve element is formed with formations retaining the ring element in place. The recess itself according to the invention is formed with a control ridge extending outward from the mouth having a height equal to about one tenth a diameter of the mouth. To this end the recess is formed of two axially offset halves meeting at a line forming the control edge. More particularly the main valve element is formed with two support ridges symmetrically flanking the recess and projecting outward therepast. The ring element is spanned over the support ridges. These support ridges are spaced apart by a distance equal to about 12.5 times a diameter of the mouth and the recess has an outside diameter equal to about 6.25 the diameter. In addition the recess is generally conical with an apex angle of between 160° and 170°.

The main body according to the invention is formed between each ridge and the recess with a cutout and the ridges are rounded. Furthermore the ring element is formed as a flat strip having a thickness equal to between one-third and one-half a diameter of the mouth and a width equal to between three and four times the mouth diameter. The center portion is formed with a generally conical bump having an apex angle of about 100° and the ring element is open and has thickened end regions trapped on the main valve element. This ring element has a Shore A hardness of about 50. The main valve body is formed of polyoximethylene.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
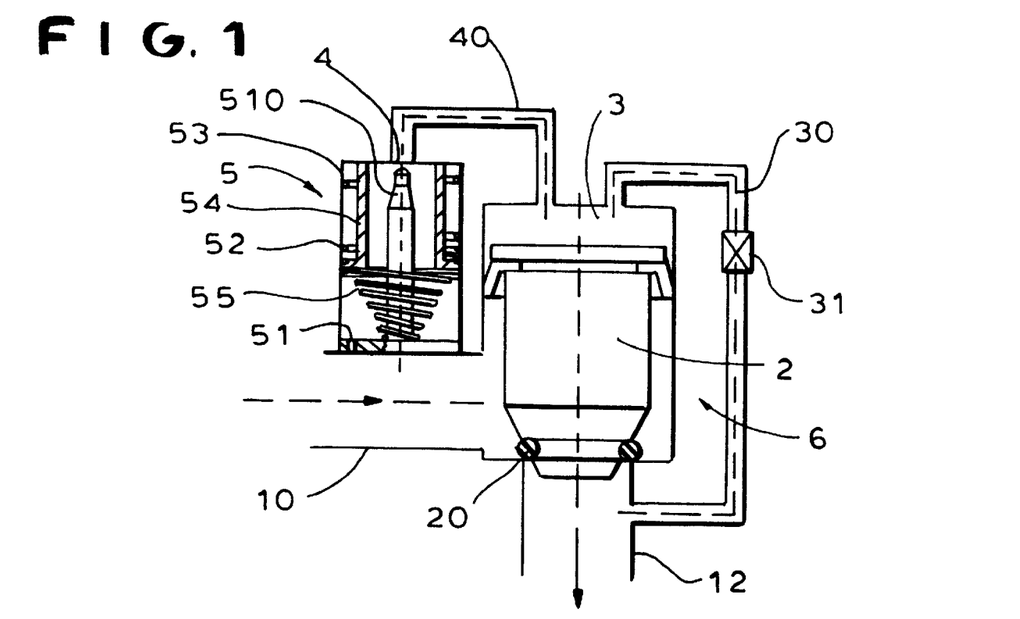
FIG. 1 is a largely schematic view of a valve system according to the invention.

As seen in FIG. 1 a valve assembly according to the invention has a main flush valve 6 with a valve element 2 that normally blocks a valve seat 20 between a high-pressure input conduit 10 and an output conduit 12. Pressure in a release chamber 3 behind the element 2 normally maintains the valve element 2 in the illustrated blocking position preventing flow from the conduit 10 to the conduit 12. A self-closing throttle valve 5 has an upstream side at the high-pressure conduit 10 and a downstream side forming a throttle passage 4 connected via a conduit 40 to the chamber 3. In addition a bypass or shunt conduit 30 is connected between the release chamber 3 and the output 12 and is provided with a manually operable pilot valve 31. The conduit 12 is connected here with the flush system of a toilet so that when the valve element 2 is backed off the seat 20 the toilet flushes.

Normally pressure from the input 10 is applied through the valve 5 and throttle passage 4 to the chamber 3 and the valve 6 remains in the illustrated blocking or closed position, as its face exposed in the chamber 3 is of greater area than its face exposed to the pressure of the input 10. When, however, the valve 31 is momentarily opened, the pressure in the chamber 3 drops suddenly and the valve element 2 lifts off the seat 20, allowing pressurized water to flow from the conduit 10 to the conduit 12. As this takes place, however, the valve 5 first closes substantially and then slowly opens, equalizing pressure between the chamber 3 and the input 10 until the valve element 2 moves down again and closes off the conduit 12. This produces a rush of water sufficient to flush the toilet, with the flow of incoming water being smoothly reduced to nothing.

Figure 2:
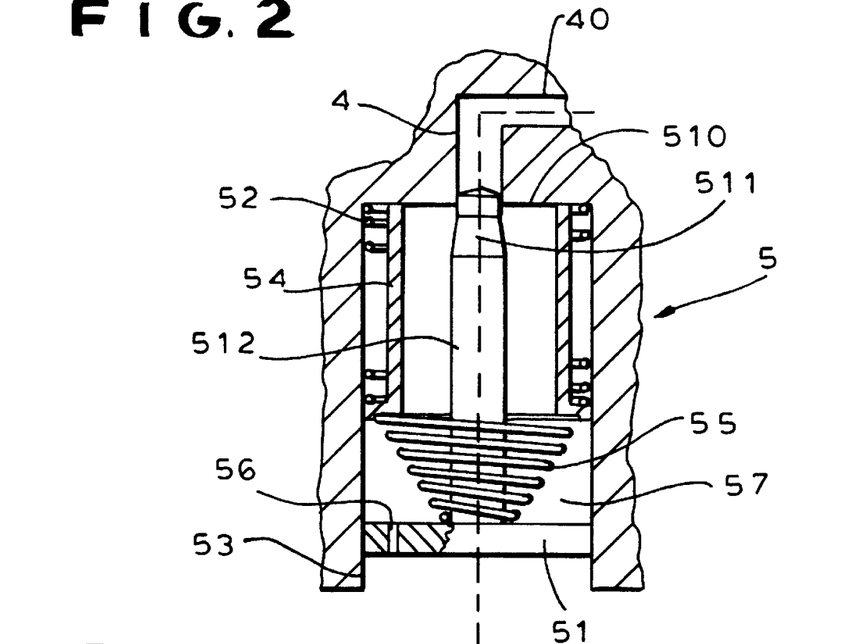
FIGS. 2 and 3 are views showing a detail of FIG. 1 in partially and fully closed positions.
Figure 3:
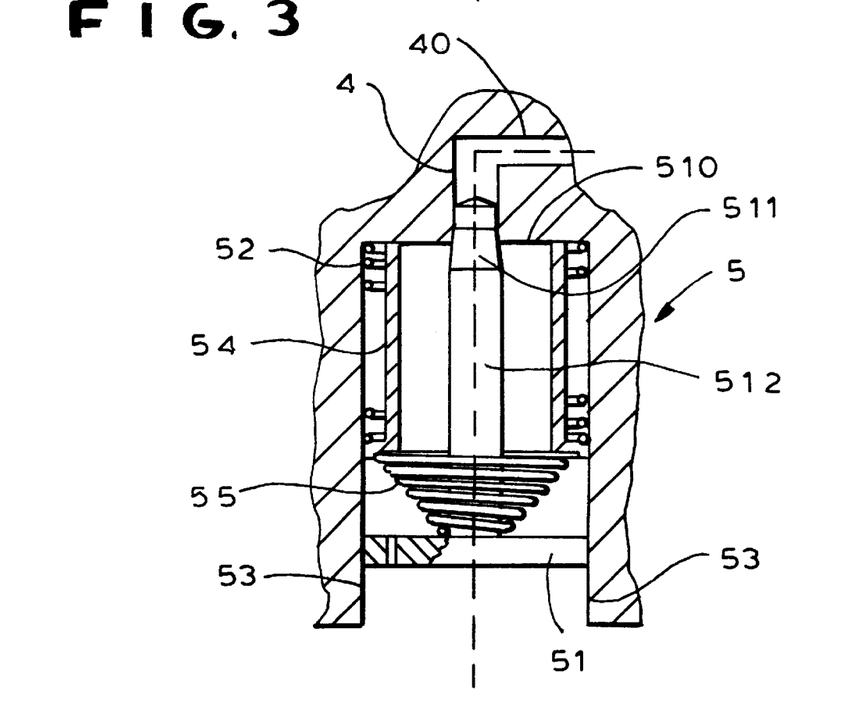

More particularly as shown in FIGS. 2 and 3, the valve 5 has a piston-like valve element 51 exposed at its outer face to the pressure in the conduit 10 and at its inner face in a chamber 57 of a cylinder 53, and formed with a small-diameter through-going pressure-equalizing orifice 56. This body 51 has a stem 512 with a small-diameter and cylindrical outer end 510 loosely engageable in the throttle passage 4 and a frustoconically flared portion immediately adjacent the end 510 and of a maximum diameter greater than that of the cylindrical throttle passage 4. A sleeve 54 is axially displaceable in the bore 53 around the stem 512 and is urged by a relatively weak spring 52 toward the body 51. A stiffer conical spring 55 is braced between the end of the sleeve 54 and the back of the body 51.

Under normal conditions the throttle valve 5 is in the position of FIG. 1, with the stem 512 wholly out of the throttle passage 4 so that foreign matter is not trapped between these parts. The two springs 52 and 55 are at maximum extension and pressure on both sides of the piston body 51 as well as in the chambers 3 and 57 are equal.

As soon as the control valve 31 is opened, the pressure in the chamber 3 plummets. As shown in FIG. 2, this action reduces the pressure in the chamber 57 behind the piston 51 so that at first the body 51 will move back so that its small-diameter end 510 will block most of the flow into the conduit 40, reducing the refill rate of the chamber 3. This action is accompanied by compression of the weak spring 52 and bottoming of the sleeve 54 on the abutment formed by the base of the bore 43. Around 80% of the total axial stroke of the restriction rod 54 is accounted for by engagement of the tip 510 in the passage 4 and the remaining 20% by engagement of the angled portion 511 in the passage 4. During this last 20% of the stroke the sleeve 54 has bottomed in the bore 53.

If the pressure differential between opposite faces of the piston 51 remains great the stiffer spring 55 will be compressed as shown in FIG. 3 to force the frustoconical region 511 into the throttle passage 4, thereby completely or substantially blocking flow into it and freezing the element 2 in place. Only as pressure between the front and back faces of the piston 51 is equalized by flow through the orifice 56 or around the piston 51 will this piston 51 move slowly outward, permitting highly restricted flow into the conduit 40 for gradual repressurization of the chamber 3 and gentle reseating of the element 2 on the seat 20.

Once the chamber 3 is fully repressurized, the rod 512 is pulled wholly out of the throttle passage 4 as in FIG. 1. Thus the function of the weak spring 52 is to pull the restriction rod 512 wholly out of the throttle passage 4 when the system is in the fully pressurized condition.

While in FIGS. 1 through 3 the throttle valve 5 is mounted parallel to the main flush valve 6, this valve 5 is mounted in the wall of the valve element 2 in FIGS. 4 through 12 where reference numerals identical to those of FIGS. 1 through 3 are used for functionally if not structurally identical elements.

Figure 4:
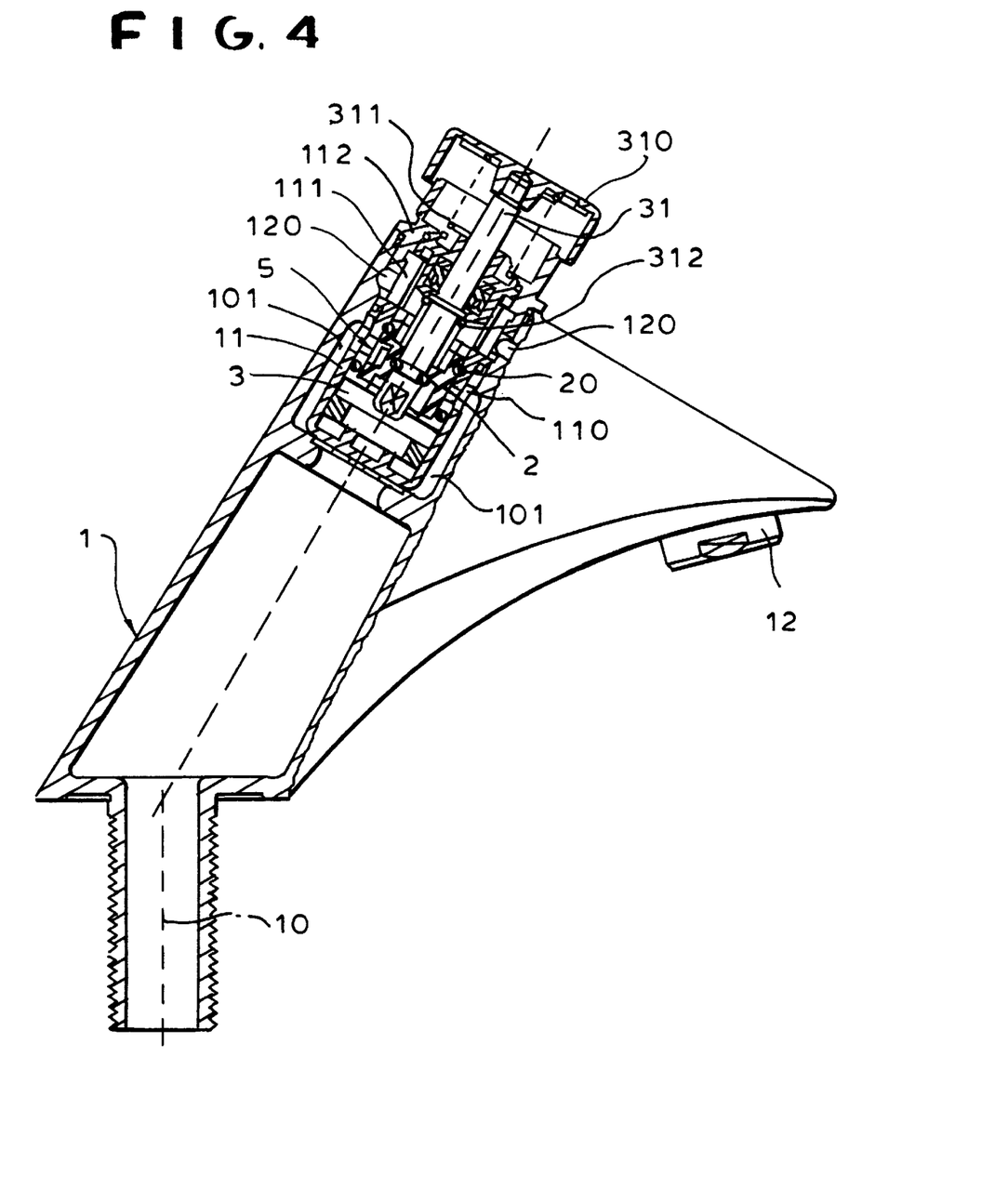
FIG. 4 is a section through a faucet incorporating a valve in accordance with the invention.
Figure 5:
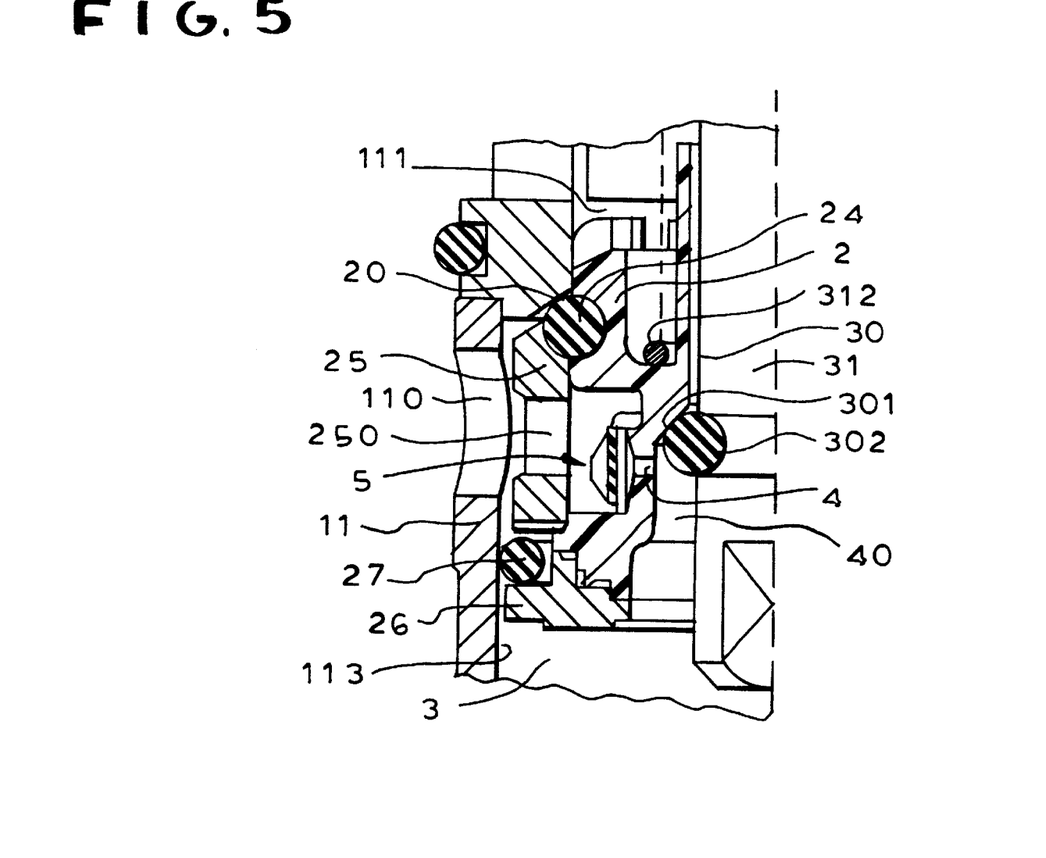
FIG. 5 is a large-scale view of a detail of FIG. 4.
Figure 6:
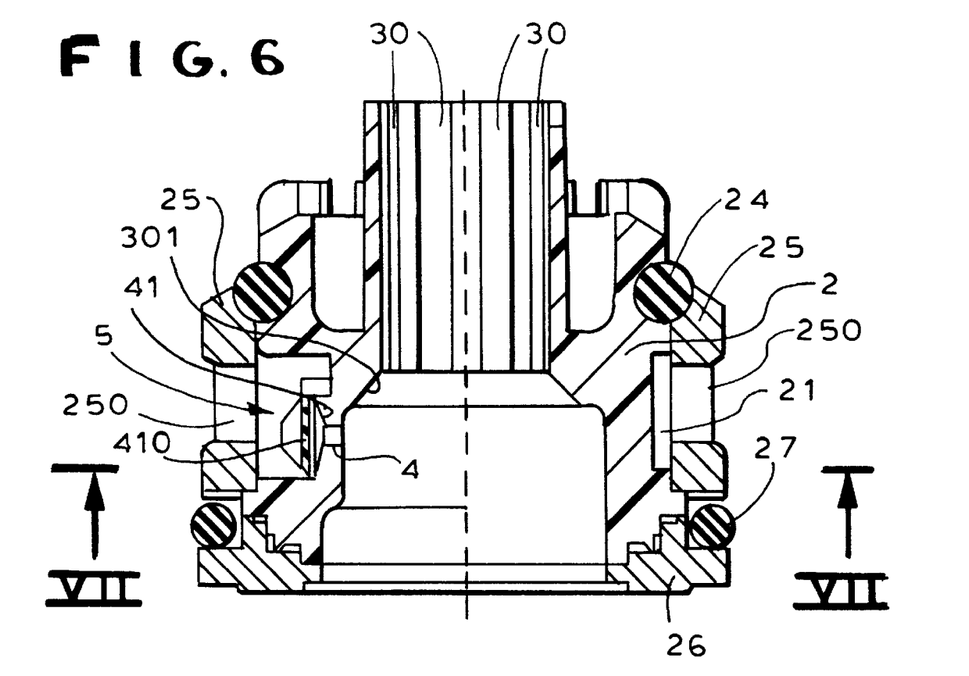
FIG. 6 is an axial section through a detail of FIG. 4.

More particularly as shown in FIG. 4 a housing 1 provided with a connection and feed nipple 10 and with an outlet 12 and contains a valve cartridge 11 containing the self-closing valve assembly of this invention. The housing 1 is mounted via the externally threaded input conduit or nipple 10 on a deck or wall and is connected by it to a source of hot, cold, or mixed water under pressure. The incoming water passes from the nipple laterally into a chamber 101 surrounding the cartridge 11 and thence through radial openings into this cartridge 11. When the cartridge 11 is in the open position described below, water flows through outlet openings 111 of the cartridge and thence via an outlet conduit 120 to the outlet 12 whence it emerges as a free stream.

The valve cartridge 11 is sealed with gaskets and held in place in the housing 1 by a cap 112. The lower region of the cartridge 11 forms the release chamber 3 which is closed upward by the main valve element 2. Coaxially in the main element 2 is the pilot valve 31 here formed as a valve rod that has an upper end projecting out of the cartridge 11 and a carrying a handle 310. In addition between the handle 310 and the cap 112 is a return spring 311. A further return spring 312 is braced against a shoulder of the rod-like valve 31 and an end of the main valve element 2.

The main valve element 2 is formed as a tubular piston and centrally accommodates the rod-like valve 31, with axially inwardly open grooves forming the passage 30 surrounding the valve 31. At its lower end it forms a valve seat 301 that cooperates with an O-ring 302 carried on the valve 31. The outer surface of the main valve element 2 is provided with an O-ring 24 that is retained in place by a spring-loaded retaining sleeve 25 and that can sealingly engage the seat 20 formed by the cartridge 11. In addition the end of the main valve element 2 opposite the release chamber 3 has a slide ring 26 that retains another O-ring 27 on the valve element 2. This O-ring 27 seals against an inner wall 113 of the valve cartridge 11.

In order that the release chamber can communicate with the pressurized water from the inlet 10, the support sleeve 25 is formed with radially throughgoing apertures 250 opening into a radially outwardly open groove 21 formed in the valve element 2. In turn this groove 21 can communicate via the throttle passage 40 with the release chamber 3. The valve element 2 is provided in the groove 21 at the passage 4 with the throttle valve that coacts with a generally conical recess 41 that is concentric with the passage 4 and that serves for pressure-related flow control.

This valve works as follows:

The user presses down on the handle 310 to move the valve 31 against the force of the springs 311 and 312 into the housing 1. This lifts the O-ring 302 from the release-chamber valve seat 301 so that the pressurized water in the chamber 3 can flow via the passages 30 into the outlet opening 111. The valve element 2 is thus no longer retained in place by the pressure in the chamber 3 and moves downward off the seat 20 into the chamber 3 so that water flows back up into the outlet openings 111 and thence via the conduit 120 to the outlet 12.

Once the handle 310 is released, the springs 311 and 312 push the rod-shaped valve 31 back into the closed position and the spring 311 also urges the valve element 311 back toward its closed position. After a short time the water flow is automatically cut off.

During the throttling and closing phase of the main valve element 2 there are substantial pressure increases in the region of the radial openings 110 of the valve cartridge 11 which can lead to accelerated closing during the throttle phase and sudden closing. This is clearly undesirable since it creates noise and a pressure shock to all the related equipment. To this end the throttling passage 4 is provided with the throttle valve 5 by means of which the closing speed of the main valve element 2 is slowed so that the valve closes gently, without any pressure shock.

Figure 10:
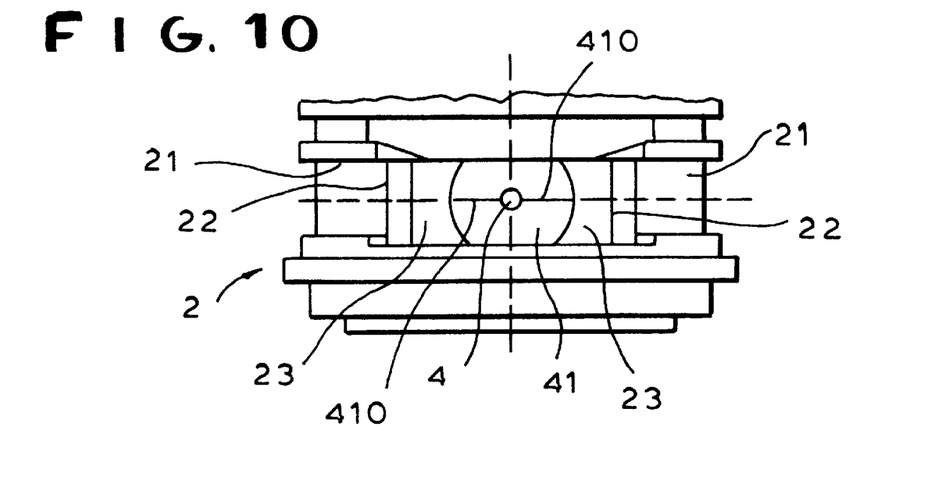
FIG. 10 is a side view with some parts removed for clarity of view of the structure of FIGS. 8 and 9.

To this end the throttle valve 5 is formed by an open ring element 56 shown in FIGS. 7 through 12. The ring can also be closed, in which case it has to be elastically deformed to be snapped into place. The throttle passage 4 is here formed as a radially extending bore opening into the recess and having a diameter of 0.8 mm. The recess has an apex angle of 164° and the outside diameter of the recess 41 is about 6.25 times the diameter of the passage 4. In addition the recess as shown in FIG. 10 is formed to each side of the passage 4 with a control edge 410 that is raised by a distance equal to about a tenth of the diameter of the passage 4. The control edge 410 is here formed by an axial offset of one half to the other half of the conical recess 41. Alternately it can be formed by a spiral raised position of the conical surface moves through 360° from the outer edge to the inner edge of a frustoconical surface.

In addition, to both sides of the recess 41 the groove 21 is formed symmetrically to both sides of the passage 4 with a support ridges 22 that are spaced apart by 12.5 times the diameter of the passage 4. Between the outer edge of the recess 41 and the support ridges 22 there is a cutout 23. The support ridges 22 as well as the outer edge and the inner edge of the recess 41 are rounded.

Figure 11:
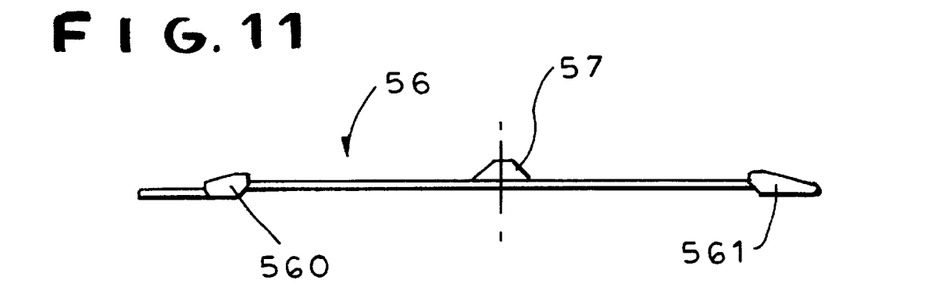
FIG. 11 is the ring of FIG. 7 flattened out.
Figure 12:
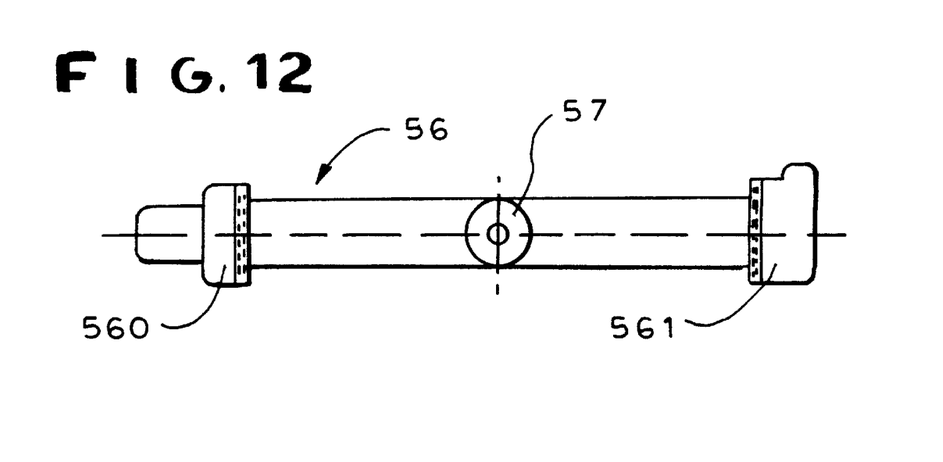
FIG. 12 is a side view of the structure of FIG. 11.

The open ring element 56 is made of a flat strip of resiliently deformable material having a thickness equal to one-third to one-half the width and three to four times the diameter of the passage 4. Its end regions are thickened at 560 and 561 so that the element 56 cannot shift angularly about the element 2. Concentric to the passage 4 and on the side turned away from the recess the ring 56 is unitarily formed with a reinforcement cone 57 having an apex angle of about 100° and a base surface somewhat smaller than the width of the strip forming the element 56. The tip of the conical or pyramidal reinforcement 57 is cut off, giving it a frustoconical shape and the opposite side of the ring element 56 is polished.

Figure 7:
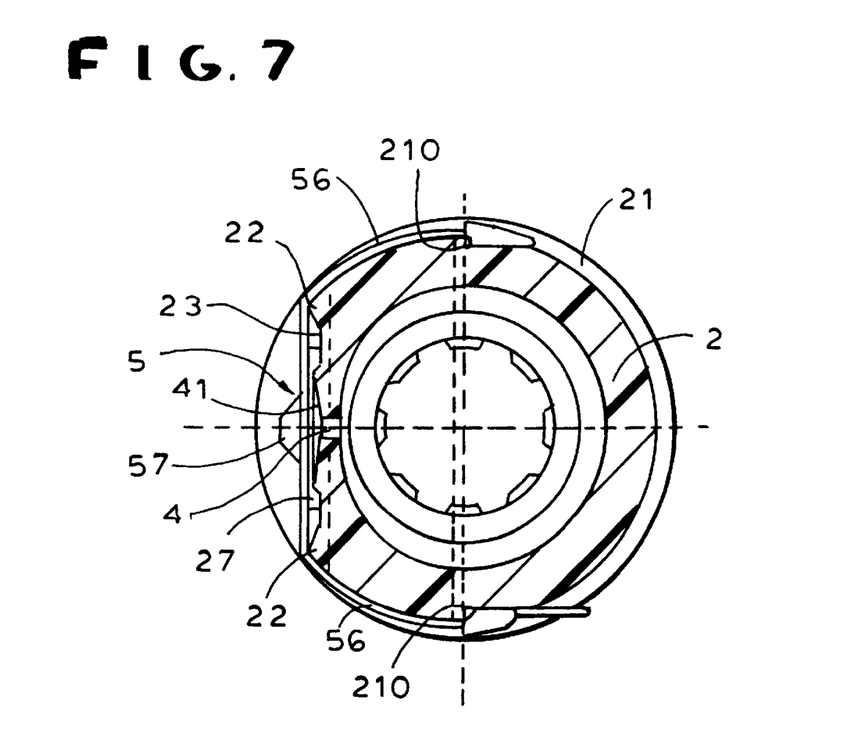
FIG. 7 is a cross section taken along line VII—VII of FIG. 6.
Figure 8:
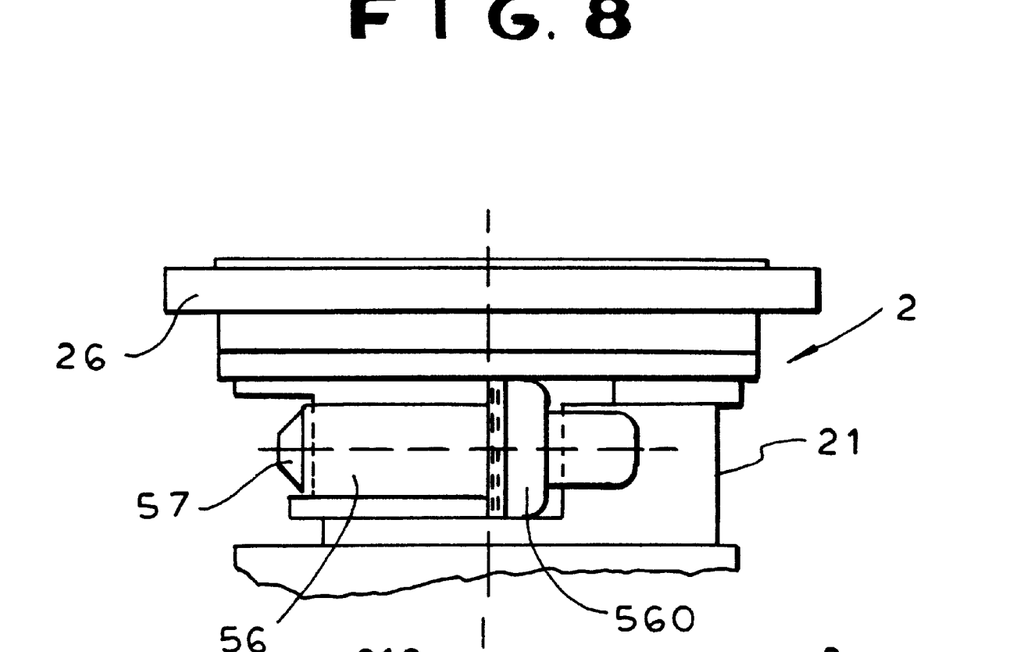
FIGS. 8 and 9 are front and back views of a detail of the valve of FIG. 4.
Figure 9:
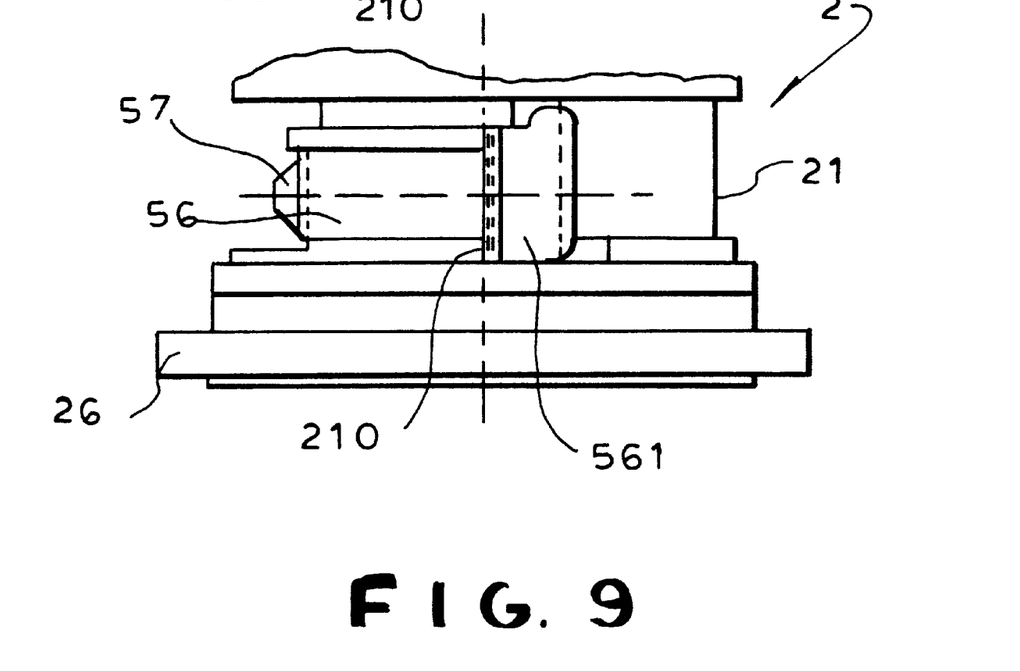

As in particular shown in FIG. 7 the ring element 56 with the thickened portions 560 and 561 is fixed in place at abutments 210 formed on the main valve element 2 in its groove 21. In the rest position it lies at a spacing equal to about one quarter of the diameter of the throttle passage from the recess 41. In this position any particles can move clear of the structure so that they will not block it when the valve 5 operates.

If, however, there is a pressure differential between the release chamber 3 and the radial openings 110 of the cartridge 1, the ring 56 will act like a spring and deflect inward at the recess 21 so as to throttle flow of water through the passage 4. If the pressure differential is considerable, this action will be even greater so that the harder spring action created by the reinforcement 57 will become effective for a further throttling of flow through the passage 4. The result is an extremely gentle closing of the valve, with flow being shut down gradually so as to completely avoid pressure shocks and noise in the lines.

The ring element is preferably made of silicone with a Shore A hardness of 50. The main valve element can be made of polyoximethylene (POM) by injection molding. Such a structure has shown itself to have a very long service life. In one test after some 200,000 cycles there was no significant change in function. With a pressure differential of 0.5 bar the port delivers a uniform flow of 7.0 ml/min of water.

While the invention is described above in a manually actuated system, used as a faucet or toilet flusher, it is also possible to incorporate it in a solenoid valve. In addition the main valve member can be a membrane instead of a piston.

I claim:

1. A self-closing valve assembly comprising:
    a main valve having
        a seat between a high-pressure input conduit and a low-pressure output conduit,
        a main valve element movable into and out of engagement with the seat to block and permit flow from the input conduit to the output conduit, and a chamber behind the main valve element pressurizable to press the main valve element against the seat;

a small-diameter passage extending from the input conduit to the chamber, whereby the chamber can be pressurized via the passage from the input conduit to hold the valve element against the seat;

a control valve connected between the chamber and the output conduit and openable for depressurizing the chamber and thereby lifting the valve element off the seat; and a throttle valve having
    a throttle body having an outer face exposed to pressurized liquid in the input conduit and an inner face turned toward a mouth of the passage,
    a formation on the inner face blockingly engageable with the passage mouth,
    an abutment adjacent the mouth of the passage and operatively engageable with the throttle body, whereby the pressurized liquid in the input conduit will urge the body toward the mouth of the passage and toward the abutment,
    weak spring means for holding the throttle body at a spacing from the mouth and from the abutment, and
    strong spring means effective when the body inner face is against the abutment for urging the body away from the mouth of the passage.

2. The self-closing valve defined in claim 1 wherein the throttle body is a piston and the formation is a throttle rod fixed on the piston and engageable in the passage, the weak spring means including a sleeve surrounding the piston and engageable with the abutment and a weak spring braced between the abutment and the sleeve, the strong spring means including a strong spring braced between the sleeve and the piston.

3. The self-closing valve defined in claim 2 wherein the throttle rod has a cylindrical outer end fittable with play in the passage mouth and immediately adjacent thereto a frusto-conical portion.

4. The self-closing valve defined in claim 1 wherein the passage mouth is formed as a recess having an outer edge forming the abutment and the throttle body has a relatively resilient outer region forming the weak spring means and engageable with edges of the recess and a relatively hard center portion forming the strong spring means.

5. The self-closing valve defined in claim 3 wherein the throttle body is formed of an elastomerically deformable material and the center portion is a generally conical thickened portion.

6. The self-closing valve defined in claim 5 wherein the throttle body includes a ring element generally engaged around the main valve element and formed with the outer region and center portion.

7. The self-closing valve defined in claim 6 wherein the ring element is open and the main valve element is formed with formations retaining the ring element in place.

8. The self-closing valve defined in claim 6 wherein the recess is formed with a control ridge extending outward from the mouth having a height equal to about one tenth a diameter of the mouth.

9. The self-closing valve defined in claim 7 wherein the recess is formed of two axially offset halves meeting at a line forming the control edge.

10. The self-closing valve defined in claim 6 wherein the main valve element is formed with two support ridges symmetrically flanking the recess and projecting outward therepast, the ring element being spanned over the support ridges.

11. The self-closing valve defined in claim 10 wherein the support ridges are spaced apart by a distance equal to about 12.5 times a diameter of the mouth and the recess has an outside diameter equal to about 6.25 the diameter.

12. The self-closing valve defined in claim 10 wherein the recess is generally conical with an apex angle of between 160° and 170°.

13. The self-closing valve defined in claim 10 wherein the main body is formed between each ridge and the recess with a cutout and the ridges are rounded.

14. The self-closing valve defined in claim 6 wherein the ring element is formed as a flat strip having a thickness equal to between one-third and one-half a diameter of the mouth and a width equal to between three and four times the mouth diameter.

15. The self-closing valve defined in claim 14 wherein the center portion is formed with a generally conical bump having an apex angle of about 100°.

16. The self-closing valve defined in claim 6 wherein the ring element is open and has thickened end regions trapped on the main valve element.

17. The self-closing valve defined in claim 6 wherein the ring element has a Shore A hardness of about 50.

18. The self-closing valve defined in claim 17 wherein the main valve body is formed of polyoximethylene.

* * * * *